United States Patent [19]
LaRue et al.

[11] Patent Number: 6,138,928
[45] Date of Patent: Oct. 31, 2000

[54] CENTER PIVOT SUSPENSION DISTRIBUTION SYSTEM

[75] Inventors: Jacob L. LaRue, Omaha; Wendell E. Dorsett, Fremont, both of Nebr.

[73] Assignee: Valmont Industries, Inc., Valley, Nebr.

[21] Appl. No.: 09/124,653

[22] Filed: Jul. 29, 1998

[51] Int. Cl.[7] ...................................................... B05B 3/00
[52] U.S. Cl. .............................. 239/728; 239/66; 239/69; 239/70; 239/97; 239/DIG. 15; 137/624.13; 137/624.2
[58] Field of Search ................................... 239/66, 69, 70, 239/97, 569, 726, 728, DIG. 15; 137/624.11, 624.13, 624.2; 364/145, 146, 147

[56] References Cited

U.S. PATENT DOCUMENTS

| | | | |
|---|---|---|---|
| 3,901,442 | 8/1975 | Chapman | 239/99 |
| 4,878,614 | 11/1989 | Hach et al. | 239/10 |
| 4,993,634 | 2/1991 | Hach et al. | 239/10 |
| 5,048,755 | 9/1991 | Dodds | 239/69 X |
| 5,878,953 | 3/1999 | Coffman | 239/69 X |
| 5,921,280 | 7/1999 | Ericksen et al. | 239/69 X |
| 5,927,603 | 7/1999 | McNabb | 239/728 X |

FOREIGN PATENT DOCUMENTS

| | | | |
|---|---|---|---|
| 095001719 | 1/1995 | WIPO | 239/69 |

OTHER PUBLICATIONS

Jamesbury Brochure "New Jamesbury Low–Cost EL Electric Actuators", Undated.

*Primary Examiner*—Andres Kashnikow
*Assistant Examiner*—Steven J. Ganey
*Attorney, Agent, or Firm*—Zarley, McKee, Thomte, Voorhees & Sease; Dennis L. Thomte

[57] ABSTRACT

A liquid suspension distribution system is provided which is essentially a conventional center pivot irrigation system, but which has the innermost sprinkler guns sequenced by way of a programmable logic control. The innermost sprinkler guns are sequenced on and off by the programmable logic controller so that an even distribution of the liquid manure or the like is achieved on the field.

6 Claims, 5 Drawing Sheets

CENTER PIVOT SUSPENSION DISTRIBUTION SYSTEM

BACKGROUND OF THE INVENTION

1. Field of the Invention

This invention relates to a center pivot suspension distribution system and more particularly to a center pivot system having the capacity to distribute liquid manure or a liquid containing suspended solid particles over a field. The center pivot system may also be used to distribute irrigating water over the field.

2. Description of the Related Art

Prior liquid/solid distribution systems do not meet the Environmental Protection Agency (EPA) or National Resource Conservation Service (NRCS) requirements for appropriate uniform distribution. The assignor of the instant invention previously developed a suspension distribution system for distributing a liquid suspension containing solid particles and the same is described in U.S. Pat. No. 3,901,442. The apparatus of U.S. Pat. No. 3,901,442 did provide a substantially uniform distribution and did allow solids to pass through the nozzles, but required the use of a mechanical cam which cycled the air pressure to air solenoids which controlled valves which operated large sprinkler guns located on top of the span. Each cam was connected to a gun and was designed to limit the operating time that the gun was operating. By utilizing a mechanical cam that constrains the operating time, the guns located near the pivot had an even coverage and allowed a minimum nozzle diameter of 0.47 inches.

Systems other than that described in U.S. Pat. No. 3,901,442 do not have sprinkler orifices that allow solids up to 0.47 inches to pass through them, thereby causing the nozzles to plug. By attaching smaller sprinklers mounted to the top of the irrigation line and adjusting the size of the orifices on each nozzle with respect to its position from the pivot point, uniformity was accomplished, but solids plugged the nozzle orifices.

SUMMARY OF THE INVENTION

A liquid suspension distribution system is described which comprises a center pivot support structure having an elongated water conduit pivoted at its inner end to the center pivot structure and extending outwardly therefrom. The water conduit is supported upon a plurality of drive towers which propel the water conduit around the center pivot structure. A plurality of longitudinally spaced-apart discharge nozzles are mounted on the water conduit for spraying the liquid suspension outwardly of the water conduit. Nozzle actuators are connected to the innermost discharge nozzles for actuating the same. The discharge nozzles located outwardly of the said innermost discharge nozzles are maintained in an open position. A Programmable Logic Control (PLC), or other programmable unit, is provided for individually controlling the nozzle actuators and for sequencing the same so that uniform distribution of the liquid suspension is achieved as the water conduit is moved around the center pivot structure by the drive towers.

The liquid distribution system of this invention is simpler and less expensive than the device described in U.S. Pat. No. 3,901,442. The distribution system of this invention evenly applies liquid livestock manure or fresh water on the field over which the system passes. The system of this invention permits a livestock producer to empty storage lagoons and waste pits in an automated fashion which reduces high labor costs and other problems associated with loading, hauling and spreading waste over cropland. Further, the system of this invention may be accomplished even though the field is wet, which would prohibit the use of an applicator vehicle. Further, the liquid suspension system of this invention reduces soil compaction.

It is therefore a principal object of the invention to provide an improved center pivot irrigation system having the capacity to distribute liquid manure or liquid containing suspended solids over a field.

Still another object of the invention is to provide a system of the type described which eliminates the need for an air compressor and air harness.

Still another object of the invention is to provide a system of the type described which provides uniform distribution beneath the system and allows solids to pass through the nozzles.

Still another object of the invention is to provide a system of the type described which is economical of manufacture.

Still another object of the invention is to provide a system of the type described which may be programmed depending on the length and flow of the system.

These and other objects will be apparent to those skilled in the art.

DESCRIPTION OF THE PREFERRED EMBODIMENT

Figure 1:
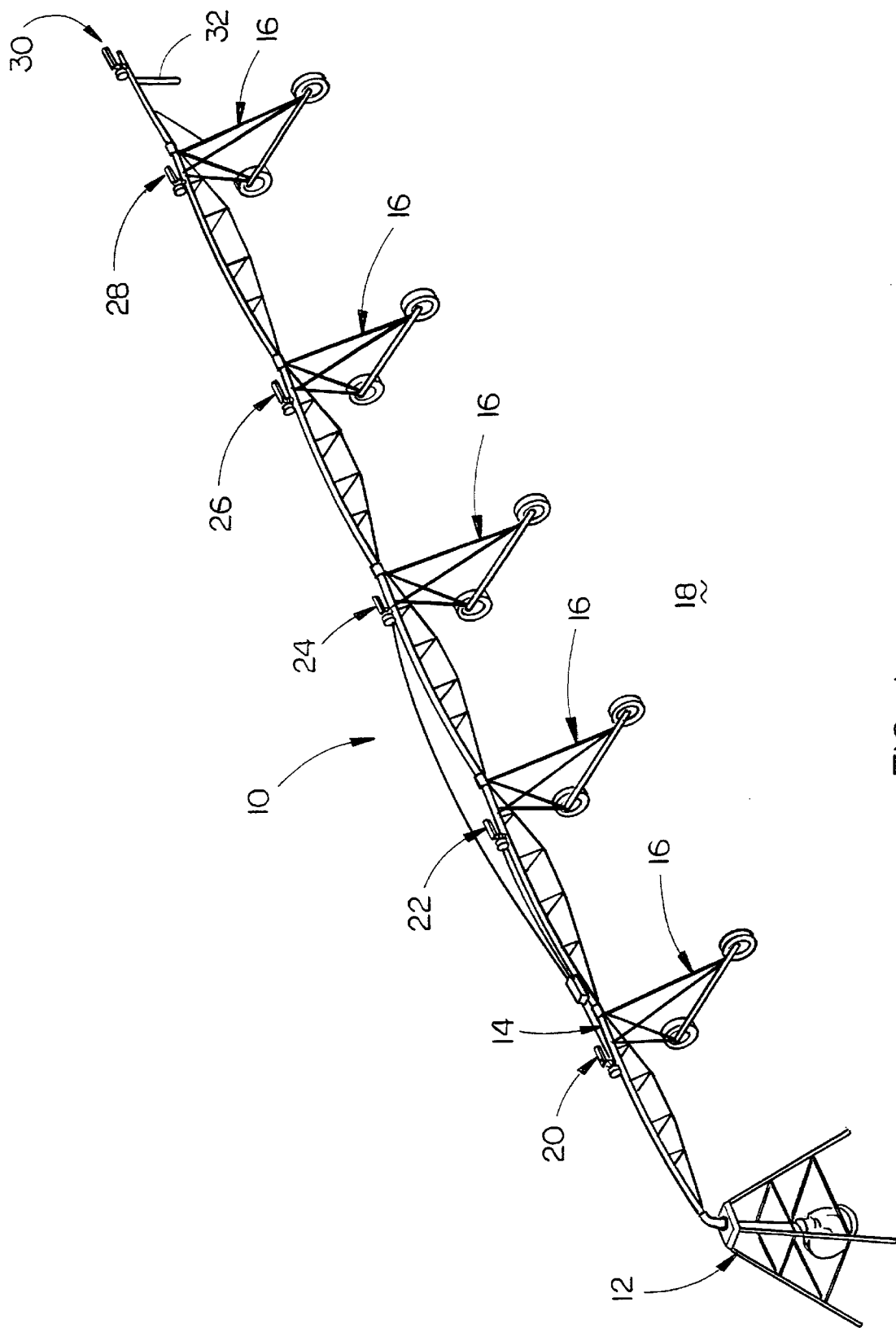
FIG. 1 is a perspective view of the system of this invention.
Figure 2:
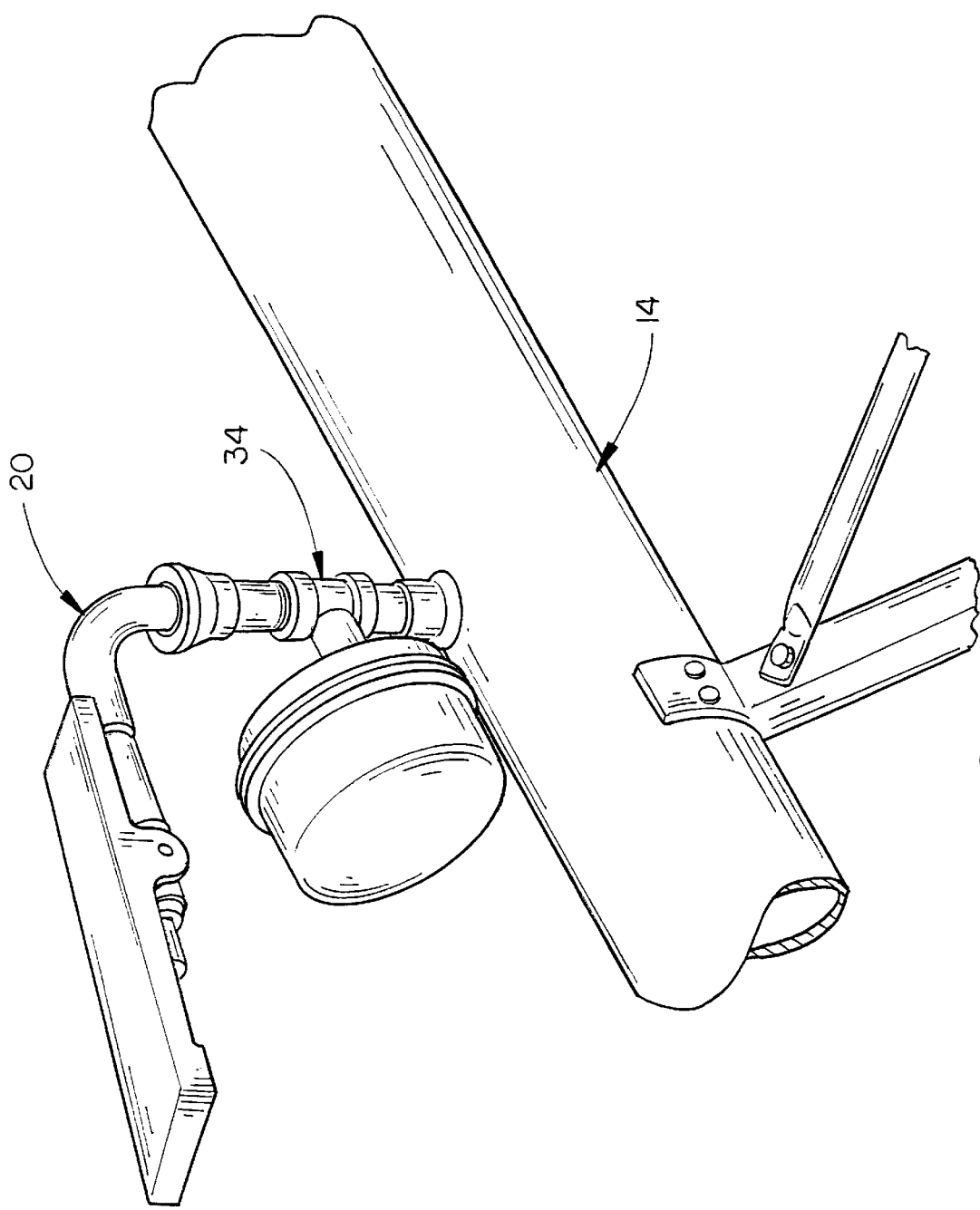
FIG. 2 is a partial perspective view of one of the sprinkler guns of this invention.

The liquid distribution system of this invention is referred to generally by the reference numeral 10 and is a conventional center pivot irrigation system except for the control of the sprinkler guns as will be described in more detail hereinafter. System 10 includes a conventional center pivot structure 12 having an elongated water pipeline or conduit 14 extending outwardly from the center pivot and which is supported upon a plurality of conventional drive towers 16. The drive towers 16 propel the conduit 14 around the center pivot structure 12 in conventional fashion so that the system may distribute liquid manure onto the field 18 or distribute other liquids containing suspended solid particles on the field 18. Further, the system may be used to irrigate the field if desired.

Figure 3:
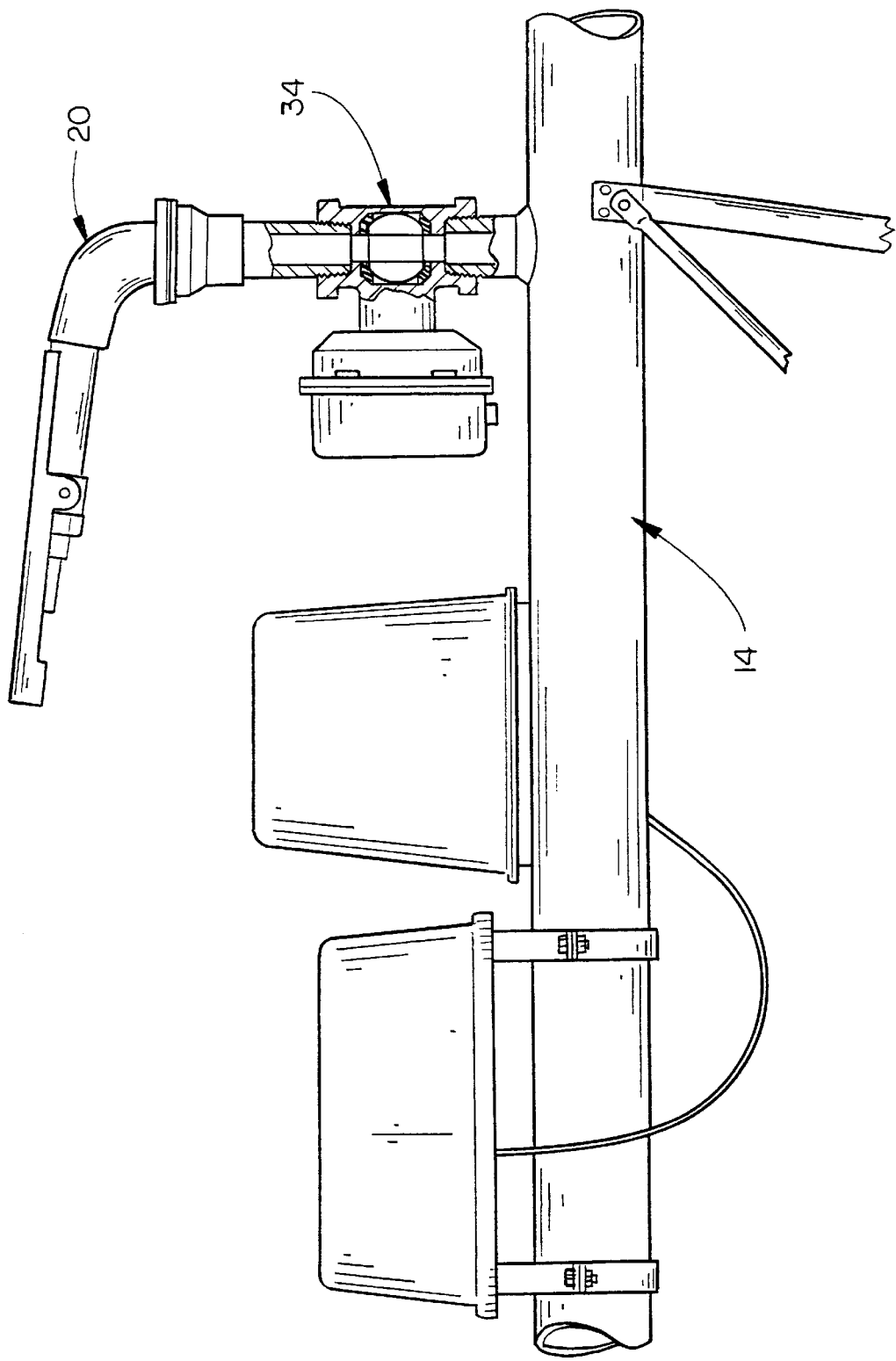
FIG. 3 is a side view of one of the sprinkler guns of this invention with portions thereof cut away.
Figure 4:
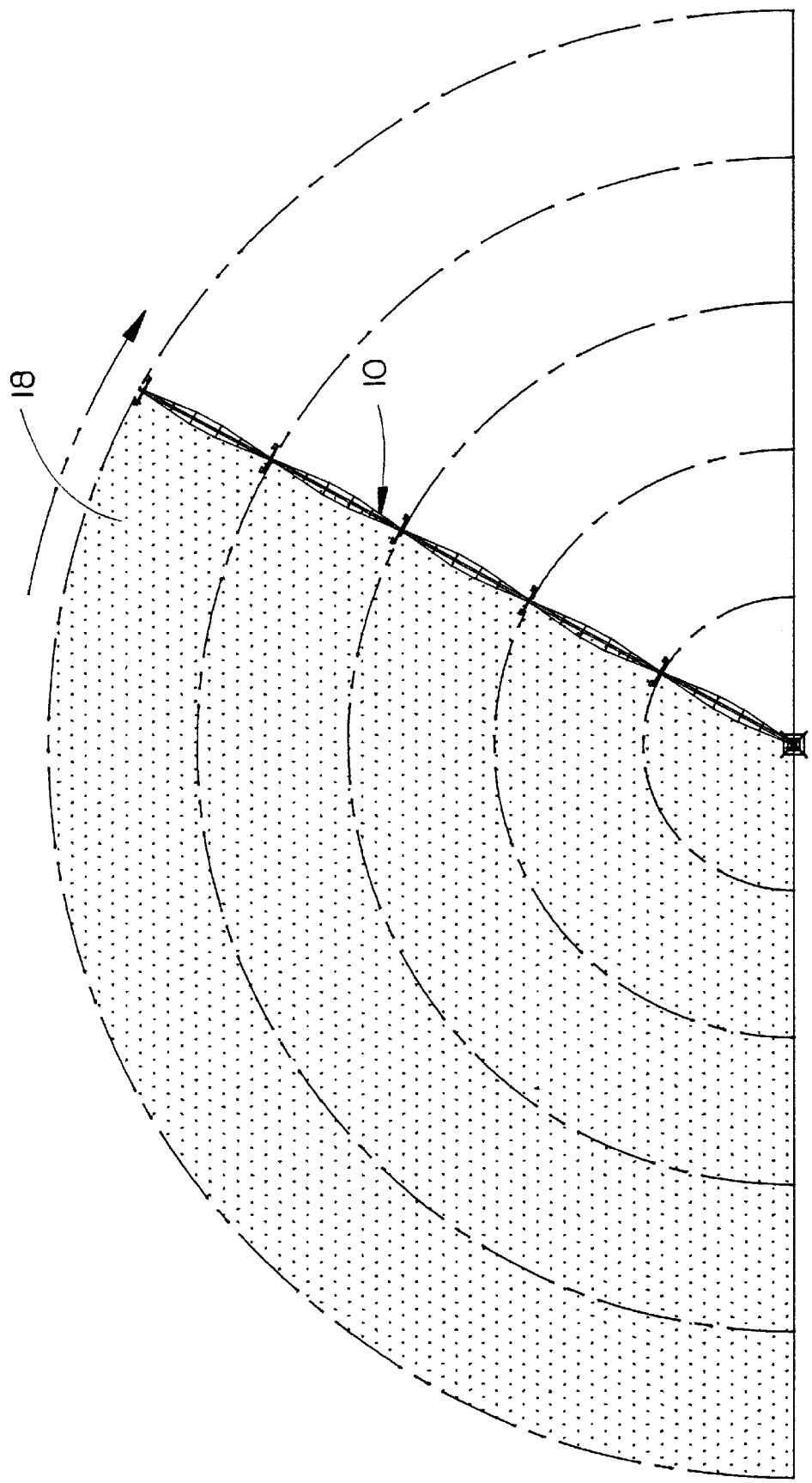
FIG. 4 is a plan view illustrating the system distributing liquid manure or the like over a field.
Figure 5:
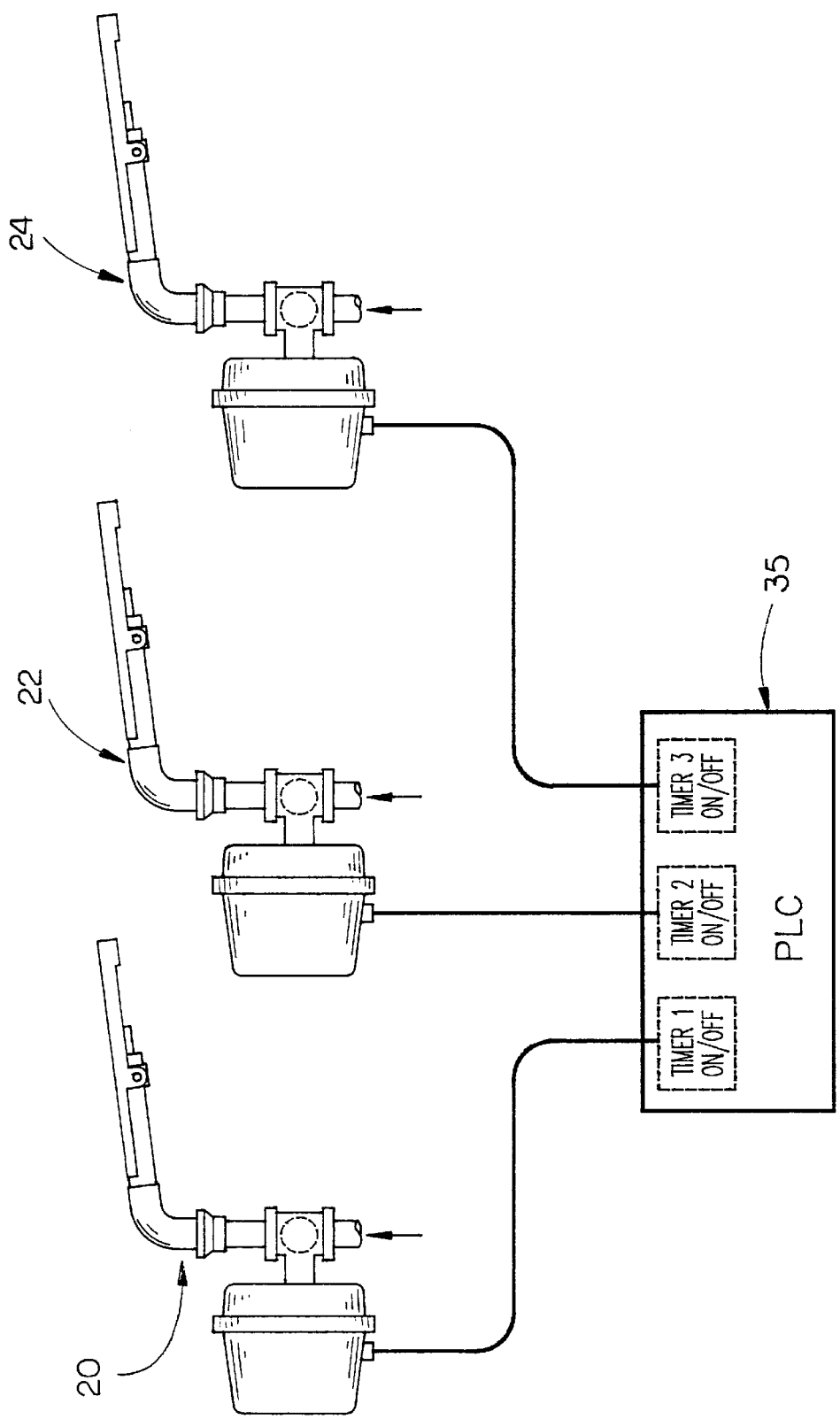
FIG. 5 is a schematic of the invention.

Sprinkler guns 20, 22, 24, 26 and 28 are provided on the pipeline 14 in a spaced-apart relationship. The number of sprinkler guns will depend upon the length of the spans, the length of the system and the flow rate. The numeral 30 refers to an end gun at the outer end of the pipeline 14 while the numeral 32 refers to a nozzle for continuous spraying. Depending upon the flow of the system and the length of the system, one or more of the sprinkler guns 20, 22, 24, 26 and 28 will be sequenced through the use of an electric or motorized ball valve assembly 34 connected to each of those sequenced sprinkler guns. FIG. 3 illustrates the motorized ball valve 34 being used to control or actuate the innermost sprinkler gun 20 and is what is referred to as a direct span mounting. An optional saddle mounting could also be provided to enable water to be directed from the interior of the pipeline 14 to the associated sprinkler gun. In certain systems, only the innermost sprinkler gun 20 will be operated by a ball valve 34. Further, in other instances, two or three of the sprinkler guns will be actuated by a ball valve 34.

The ball valves 34 are individually controlled by a Programmable Logic Controller (PLC) 35 or other programmable unit. The programmable unit controls the open time and the shut time of the sprinkler guns 20, 22 and 24 (in this case), but the PLC may, in some instances, only control the innermost sprinkler gun, or the two innermost sprinkler guns. The sprinkler guns located outwardly of the programmed sprinkler guns are adjusted using progressively larger nozzles to meet uniform distribution requirements. In addition, the nozzle 32 is utilized on the end of the pivot to provide continuous flow.

Assuming that only the two innermost sprinkler guns 20 and 22 are being sequenced by ball valves and the PLC connected thereto, a typical timer setting is illustrated in Table 1 hereinbelow.

TABLE 1

| TIMER SETTINGS | | |
|---|---|---|
| | VALVE 1 | VALVE 2 |
| INITIATE | 1 MIN. OFF | 4 MIN. OFF |
| DURATION | 3 MIN. ON | 7 MIN. ON |
| CYCLE | 7 MIN. OFF | 3 MIN. OFF |

In Table 1, assuming that the system timer is set at one hundred percent, during the initiate phase of the operation, sprinkler gun 20 is initially off for one minute and sprinkler gun 22 is initially off for four minutes. After sprinkler gun 20 has been off for one minute, it will then come on for three minutes and then be off for seven minutes. After the sprinkler gun 22 has been off for its initial four minute period, the sprinkler gun 22 will be on for seven minutes and off for three minutes. The three minute on and seven minute off cycle for sprinkler gun 20 will be continuously repeated as will the seven minute "on" and three minute "off" sequence of sprinkler gun 22. If the system timer is set at fifty percent, the timer of Table 1 will be doubled. The system movement will determine the "on" and "off" times.

Thus it can be seen that a novel liquid distribution system has been provided which ensures that liquid manure or other liquids containing solid particles will be evenly distributed beneath the system as the system is propelled around the center pivot structure. The system of this invention, by eliminating the mechanical cams of U.S. Pat. No. 3,901,442, provides a less expensive and simpler alternative to the device described in U.S. Pat. No. 3,901,442. Further, the system of this invention enables a livestock producer to automatically empty storage lagoons and waste pits without the necessity of loading, hauling and spreading waste over cropland by way of distribution vehicles. Further, the system of this invention may be used even though the field is wet which would prohibit applicator vehicles being used. Additionally, the system of this invention reduces the amount of soil compaction that would otherwise occur if applicator vehicles were used to distribute the liquid manure over the field.

Thus it can be seen that the invention accomplishes at least all of its stated objectives.

We claim:

1. A liquid suspension distribution system, comprising:
   a center pivot support structure;
   an elongated water conduit, having inner and outer ends, pivoted at its said inner end to said center pivot support structure and extending outwardly therefrom;
   said water conduit supported on at least one drive tower which propels said water conduit around said center pivot structure;
   a plurality of longitudinally spaced-apart discharge nozzles mounted on said water conduit for spraying the liquid suspension outwardly of said water conduit;
   a first nozzle actuator connected to the innermost discharge nozzle to actuate the innermost nozzle between open and closed positions;
   a second nozzle actuator connected to the discharge nozzle located immediately outwardly of the innermost discharge nozzle to actuate the nozzle between open and closed positions;
   the discharge nozzles located outwardly of the two innermost discharge nozzles always being in an open position;
   and means for individually controlling said first and second nozzle actuators whereby either of said first and second nozzle actuators may be actuated or deactuated.

2. The system of claim 1 wherein said means for individually controlling said first and second nozzle actuators comprises a programmable logic control.

3. A liquid suspension distribution system, comprising:
   a center pivot support structure;
   an elongated water conduit, having inner and outer ends, pivoted at its said inner end to said center pivot support structure and extending outwardly therefrom;
   said water conduit supported on at least one drive tower which propels said water conduit around said center pivot structure;
   a plurality of longitudinally spaced-apart discharge nozzles mounted on said water conduit for spraying the liquid suspension outwardly of said water conduit;
   a first nozzle actuator connected to the innermost discharge nozzle to actuate the innermost nozzle between open and closed positions;
   a second nozzle actuator connected to the discharge nozzle located immediately outwardly of the innermost discharge nozzle to actuate the nozzle between open and closed positions;
   a third nozzle actuator connected to the discharge nozzle located immediately outwardly of the discharge nozzle controlled by said second nozzle actuator to actuate the nozzle between open and closed positions;

the discharge nozzles located outwardly of the three innermost discharge nozzles always being in an open position;

and means for individually controlling said first, second and third nozzle actuators whereby either of said first, second and third nozzle actuators may be actuated or deactivated.

4. The system of claim 3 wherein said means for individually controlling said first, second and third nozzle actuators comprises a programmable logic control.

5. A liquid suspension distribution system, comprising:

a center pivot support structure;

an elongated water conduit, having inner and outer ends, pivoted at its said inner end to said center pivot support structure and extending outwardly therefrom;

said water conduit supported on at least one drive tower which propels said water conduit around said center pivot structure;

a plurality of longitudinally spaced-apart discharge nozzles mounted on said water conduit for spraying the liquid suspension outwardly of said water conduit;

a nozzle actuator connected to each of a predetermined number of the innermost discharge nozzles to actuate each of the said innermost nozzles between open and closed positions;

the discharge nozzles located outwardly of said predetermined number of the innermost discharge nozzles always being in an open position;

and means for individually controlling said nozzle actuators whereby any of said predetermined number of innermost discharge nozzles may be actuated or deactuated.

6. The system of claim 1 wherein said means for individually controlling said discharge nozzles comprises a programmable logic control.

* * * * *